United States Patent [19]

McArthur

[11] 3,998,930
[45] Dec. 21, 1976

[54] IRIDIUM-NICKEL EXHAUST GAS CONVERSION CATALYST AND PROCESS

[75] Inventor: Dennis P. McArthur, Yorba Linda, Calif.

[73] Assignee: Union Oil Company of California, Los Angeles, Calif.

[22] Filed: May 17, 1974

[21] Appl. No.: 470,680

Related U.S. Application Data

[63] Continuation of Ser. No. 327,862, Jan. 29, 1973, abandoned.

[52] U.S. Cl. .................................... 423/213.5
[51] Int. Cl.² ..................................... B01D 53/34
[58] Field of Search ......... 423/213.2, 213.5, 213.7; 60/301

[56] References Cited
UNITED STATES PATENTS

| | | | |
|---|---|---|---|
| 2,118,143 | 5/1938 | Benner et al. ................. | 423/279 X |
| 2,601,221 | 6/1952 | Rosenblatt ..................... | 423/351 |
| 3,224,831 | 12/1965 | Stephens ........................ | 423/213.5 |
| 3,331,787 | 7/1967 | Keith et al. .................... | 423/212 X |
| 3,637,344 | 1/1971 | Thompson ....................... | 423/213.7 |
| 3,816,594 | 6/1974 | Kobylinksi et al. ............. | 423/213.5 |
| 3,842,159 | 10/1974 | Niebylski et al. .............. | 423/213.7 |
| 3,886,260 | 5/1975 | Unland .......................... | 423/213.5 |

Primary Examiner—G. O. Peters
Attorney, Agent, or Firm—Lannas S. Henderson; Richard C. Hartman; Dean Sandford

[57] ABSTRACT

Process and catalyst for the catalytic conversion of nitrogen oxides ($NO_x$), unburned hydrocarbons and carbon monoxide in internal combustion engine exhaust gases. The catalyst comprises essentially a composite of nickel and a minor proportion of iridium. This composite catalyst is found to be exceptionally resistant to poisoning by sulfur and lead compounds present in the exhaust gases.

4 Claims, No Drawings

IRIDIUM-NICKEL EXHAUST GAS CONVERSION CATALYST AND PROCESS

This is a continuation of application Ser. No. 327,862, filed Jan. 29, 1973 now abandoned.

BACKGROUND AND SUMMARY OF INVENTION

Much effort has been devoted in recent years to the development of catalytic converters for removing air pollutants such as hydrocarbons, carbon monoxide and nitrogen oxides from engine exhaust gases. A general approach has been to provide a two-stage conversion system (as illustrated for example in U.S. Pat. No. 3,544,264), involving an initial contacting zone in which the raw exhaust gases are passed under reducing conditions over a suitable catalyst in the absence of added air, followed by a second zone in which oxidation of remaining CO and hydrocarbons is effected by adding to the first stage off-gases at least a stoichiometric proportion of air. Exemplary reactions which are believed to occur at least to some extent in the first conversion stage are as follows:

$$2 CO + 2NO \rightarrow N_2 + 2CO_2 \tag{1}$$

$$CO + H_2O \rightleftarrows CO_2 + H_2 \tag{2}$$

$$C_xH_y + xH_2O \rightleftarrows xCO + (y/2 + x)H_2 \tag{3}$$

$$2NO + 2H_2 \rightarrow N_2 + 2H_2O \tag{4}$$

$$2NO + 5H_2 \rightarrow 2NH_3 + 2H_2O \tag{5}$$

$$xNO + C_xH_y \rightarrow (x/2)N_2 + xCO + (y/2)H_2 \tag{6}$$

These reactions occur under what may be designated "net reducing" conditions, i.e., conditions wherein the mole ratio of oxygen to carbon monoxide and hydrocarbons is less than stoichiometric. Reactions 2 and 3 seldom go to completion, so that the off gases from the first stage nearly always comprise at least a near equilibrium proportion of carbon monoxide and hydrocarbons. It is hence necessary to provide a second oxidation stage with added air in order to complete the oxidation of carbon monoxide and hydrocarbons. The catalysts of this invention are useful in both stages of these systems, but are exceptionally active for nitrogen oxide ($NO_x$) conversion in the first stage. Moreover, at temperatures above about 900° F., they are very selective for converting $NO_x$ to elemental nitrogen (reactions 1, 4 and 6) rather than to ammonia (reaction 5). This is a decided advantage because any ammonia formed in the first stage is oxidized in the second stage back to NO which is then emitted to the atmosphere as a pollutant.

Several types of catalysts are known in the art which can achieve the desired activity and selectivity for $NO_x$ conversion if the exhaust gases are essentially free of sulfur and lead. However, activity is rapidly lost when one or both of these poisons is introduced into the exhaust gas. Different catalysts exhibit varying responses to each of these poisons. For example, base metal catalysts such as copper-nickel composites are only moderately affected by lead, but are drastically reduced in activity by sulfur and sulfur-lead combinations. Certain noble metals such as platinum and palladium are relatively unaffected by sulfur, but are drastically poisoned by lead and especially lead-sulfur combinations. The search for a catalyst which is suitably resistant to both of these poisons has heretofore proven unfruitful.

I have now discovered however that, in sharp contrast to platinum-nickel and palladium-nickel catalysts, the combination of nickel with iridium is remarkably resistant to deactivation by both sulfur and lead, or a combination of the two. Further, whereas platinum and palladium tend to deactivate at high temperatures due to metal agglomeration, iridium is much less susceptible to this phenomenon and hence gives a more stable catalyst which is highly resistant to thermal deactivation. A fortuitous aspect of the invention is that the iridium is found to be effective in very small proportions, as little as 0.005 weight-percent on a suitable inert support. Finally, iridium has an advantage over another lead-resistant noble metal, ruthenium, in that the latter has a greater propensity to form volatile oxides.

DETAILED DESCRIPTION

The catalysts of this invention may be prepared by several different methods, in supported or unsupported form, and may take a variety of shapes, forms and sizes. By far the most practical type of catalyst however is the supported form, comprising a major proportion of a porous, thermally stable, inert support material such as carborundum, alpha alumina, delta alumina, mullite, aluminum phosphate, aluminum borate and the like, upon which is supported a minor proportion of nickel and a still smaller proportion of iridium. Such catalysts may be prepared by conventional methods such as comulling the dry or moistened ingredients, followed by shaping the material into suitable granular or monolithic forms. Preferably however the support material is first shaped into the desired form, as by pelleting, extruding, prilling or the like, dried and preferably calcined, and then impregnated with suitable solutions of the desired metal salts, either simultaneously or sequentially. The sequential method is preferred, with the nickel constituent being applied first. The impregnated support material is then dried and calcined to form the finished catalyst.

The metal contents of the finished catalysts may range between about 1–25 weight-percent, preferably about 4–15 weight-percent of nickel as NiO, and between about 0.005 percent and 0.5 percent, preferably about 0.01 and 0.1 percent of iridium. The weight ratio of NiO to Ir in th catalyst should range between about 50 and 1500, preferably about 100–500.

Where the support material is shaped into granular forms for impregnation, suitable size ranges between about 1/32 and ½ inch, the preferred size depending primarily upon the macroporosity of the support. The impregnation technique may also be utilized for impregnating preformed monolithic honeycomb structures formed from the support material. An alternative monolith form can be composed of an inert, low surface area material such as alpha alumina or cordierite, upon which a thin layer of the desired high surface area support is deposited, as by coating the monolith with a slurry of the high-surface-area support material. This preformed composite monolith is then calcined and impregnated with solutions of the active metals.

It should not be concluded from the above that extremely high surface area supports ae required herein. For the reactions and conditions prevailing in exhaust gas conversion, extremely high surface areas are not required; preferred supports may range in surface area between about 5–100 m²/g.

For exhaust gas conversion catalysts, primary requirements for suitable supports are good mechanical strength, low bulk density, thermal and hydrothermal stability, shrink resistance, and chemical inertness. An ideal combination of these qualities has recently been found to inhere in a new class of crystalline aluminum borates described in my U.S. Pat. No. 3,856,765. These preferred crystalline aluminum borates are prepared by calcining an intimate admixture of alumina with boria, or a boria precursor such as boric acid at temperatures between about 1250° and 2600° F., preferably about 1450°–2300° F. The proportion of boron compound employed should be adjusted to provide a finished catalyst support wherein the weight ratio of $B_2O_3/Al_2O_3$ is between about 5/95 and 35/65, preferably between about 8/92 and 25/75. The overall severity of the calcination step should be controlled so as to produce a substantial, X-ray detectable phase of crystalline $9Al_2O_3.2B_2O_3$. Usually a relatively minor phase, believed to be $2Al_2O_3.B_2O_3$, is also present.

The size of the aluminum borate crystallites produced in the final calcination is the primary parameter governing critical functional aspects of the support such as mechanical and thermal stability, porosity, pore size distribution and surface area. Calcination temperatures in the high ranges tend to produce large crystallites with resultant reduction in surface area and increase in average pore size. Conversely, the lower temperatures tend to give smaller crystallites, higher surface areas and smaller pores. For purposes of this invention, it is desirable to control the calcining so as to give a support having a surface area between about 5 –100, preferably about 20 –80 m²/g, with a porosity of about 0.3 –1.0, preferably 0.5 –0.8 ml/g.

The preferred aluminum borate supports contain substantially no free boria. Free $B_2O_3$ melts at about 860° F. and develops a substantial vapor pressure at temperatures above about 1200° F. Hence, during calcination following the addition of active metal salts, and/or during subsequent use of the catalyst in exhaust gas converters, any free boria may become very mobile and active as liquid and/or vapor, and tends to combine with and deactivate the active metals. Also, if water is present, volatile metaboric acid may be formed which becomes corrosive to ferrous metals at elevated temperatures, as is molten $B_2O_3$ itself. In contrast to the hydrothermal instability of $B_2O_3$, the compounds $9Al_2O_3.2B_2O_3$ and $2Al_2O_3.B_2O_3$ appear to be hydrothermally stable up to temperatures of at least about 3540° and 1895° F., respectively.

A number of effective methods have been developed for removing free boria from the catalyst supports, including primarily the following:

1. Calcination at temperatures above about 1800° F.
2. Steaming at temperatures above about 400° F.
3. Leaching with hot water at, e.g., 200°–400° F.
4. Leaching in 10–28 percent aqueous ammonia solutions at, e.g., 50°–120° F.
5. Any combination of the foregoing procedures.

Leaching with boilling water and/or with warm concentrated $NH_4OH$ solutions appear to be the most effective treatments.

Following calcination and (if desired) removal of free boria, the support may be impregnated in conventional manner with a solution or solutions of the desired nickel, and iridium salts. Operative salts include the nitrates, chlorides, acetates, oxalates, sulfates and the like, the preferred salts being those whose anions are thermally decomposable to give the corresponding metal oxide and/or sulfide. Following impregnation, the catalyst is drained, dried and calcined in conventional manner at temperatures of e.g., 500°–1500° F.

The finished catalysts produced as described are found to be highly active and selective for the conversion of $NO_x$ in exhaust gases derived from the combustion of fuels containing from 10–500 ppm or more of sulfur, and from about 0.01–4 grams of lead per gallon, and at gas hourly space velocities ranging between about 20,000 and 200,000 standard volumes per volume of catalyst per hour. Normally, acceptable activity and selectivity are maintained for upwards of 25,000 miles of average driving.

The following examples are cited to illustrate the invention, but are not to be construed as limiting in scope:

EXAMPLE I

Preparation of Catalyst Support

About 2800 grams of boehmite alumina was impregnated with about 4550 grams of orthoboric acid dissolved in sufficient water to provide about 95 percent saturation at 200° F., the impregnation being carried out at that temperature. The resulting hot slurry was then filtered to remove excess solution, washed with hot water, dried and calcined at 800° F. The resulting filter cake was then broken up and dry mulled for a short time, after which sufficient concentrated ammonium hydroxide was added to give an extrudable paste. The mixture was extruded through a ⅛ inch die at an extrusion pressure of about 800 psi, broken into extrudates of about ⅛–¼ inch length, and dried at 250° F. for 1 hour. The dried extrudates were then heated from 200° to 1800° F. over a period of about 12 hours, and held at 1800° F. for 2 hours. Following this calcining step, the extrudates were washed in concentrated ammonium hydroxide for 1 hour, boiled in water for 1 hour to displace ammonia, and then boiled again for 1 hour. The product ws then dried and calcined for 1 hour at 1200° F. The final product had a compacted bulk density of about 0.5 g/ml and had good mechanical strength. X-ray detectable phases of the 9:2 and the 2:1 crystalline aluminum borates were present.

EXAMPLES II–IV

Preparation of Catalysts

Catalyst No. 1 (Ni—Ir) was prepared by impregnating 50 ml of the calcined support from Example I with a nickel nitrate solution to yield 10 weight-percent NiO after calcination. The soak time was 15 minutes. The extrudates were then air dried at room temperature for 30 minutes, oven dried at 110° C. for 1 hour and calcined in air at 1500° F. for about 15 hours. The extrudates were then impregnated with an aqueous ammoniacal solution of iridium chloride to give approximately 0.1 weight-percent iridium in the final composition. The extrudates were then air dried at room temperature for 2 hours.

Catalyst No. 2 (Pt—Ni) was prepared in the same manner, using platinous chloride in place of the iridium chloride.

Catalyst No. 3 (Pd—Ni) was prepared in the same manner using a solution of palladium chloride in place of iridium chloride.

Each of the foregoing catalysts contained about 10 weight-percent NiO, and 0.1 weight-percent of the respective noble metal.

EXAMPLES V–VII

Activity Testing With Sulfur Present

The foregoing catalysts were tested for nitric oxide conversion activity and selectivity, using as the feed a synthetic exhaust gas having the following composition:

| | |
|---|---|
| $N_2$ | 74.1 % |
| $CO_2$ | 13.0 |
| $H_2O$ | 10.0 |
| CO | 1.0 |
| $C_3H_6$ | 0.1 |
| $O_2$ | 0.35 |
| $H_2$ | 0.33 |
| NO | 0.08 |
| $SO_2$ | 0.0045[(2)] |

[(2)]This amount of sulfur is approximately equivalent to 350 ppm sulfur in gasoline.

The test procedure consisted in passing the feed gas through the catalyst bed at a gas hourly space velocity of 45,000, measuring NO conversion at about 1,000° F. (which generally gives 100% conversion), then at successively lower temperatures so as to bracket the 50 percent conversion temperature and obtain temperature coefficients. From this the 50 percent and 90 percent conversion temperatures were calculated, based on the first order rate equation. Efficiency of conversion to nitrogen was determined at 1000° F. ("Efficiency" refers to the selectivity of conversion to nitrogen times the overall conversion of NO. "Selectivity" is the percent of NO converted which was converted to nitrogen). The results of the runs were as follows:

Table 1

| Catalyst | 90% $NO_x$ Conv. Temp, ° F. | 50% $NO_x$ Conv. Temp, ° F. | % Efficiency at 1000° F. |
|---|---|---|---|
| 1. Ni-Ir | 540 | 500 | 81 |
| 2. Ni-Pt | 530 | 485 | 64 |
| 3. Ni-Pd | 950 | 550 | 74 |

The foregoing data shows that the iridium-nickel and platinum-nickel catalysts are substantially more active than the palladium-nickel combination for $NO_x$ conversion, while the iridium-nickel catalyst is superior from the standpoint of efficiency of conversion to nitrogen.

EXAMPLES VIII–X

Activity Testing In The Presence Of Sulfur and Lead:

In order to simulate the effect of both lead and sulfur on the catalysts, samples of each of the fresh catalysts from Examples II–IV were impregnated with aqueous solutions of lead acetate to give the lead loadings shown in Table 2. The lead poisoned catalysts were then activity tested as described in Examples V–VII, with the following results:

Table 2

| Catalyst | Wt-% Pb | 90% $NO_x$ Conv. Temp, ° F. | 50% $NO_x$ Conv. Temp, ° F. | % Efficiency at 1000° F. |
|---|---|---|---|---|
| 1. Ni-Ir | 0.5 | 700 | 530 | 85 |
| 2. Ni-Pt | 0.3 | 1340 | 965 | 53 |
| 3. Ni-Pd | 0.3 | 1300 | 890 | 64 |

The dramatic superiority of the iridium-nickel catalyst over the palladium and platinum analogs is readily apparent, both as to activity and efficiency in the presence of both sulfur and lead. Other catalysts within the purview of this invention display similar differential results over their palladium or platinum analogs.

EXAMPLES XI–XIII

For purposes of actual engine testing, three monolith catalysts were prepared. The base for each catalyst was an American Lava cordierite support, Al Si Mag 795 of the stacked corrugated type, upon which was deposited from an aqueous slurry a wash coat of powdered alumina and boric acid in proportions to provide about an 80/20 weight-ratio of $Al_2O_3/B_2O_3$ on the calcined supports. Each support was then dried and calcined at 1800° F. The resulting crystalline aluminum borate coating on each support amounted to about 15 weight-percent of the monolith.

Each support was then impregnated with nickel nitrate solution to provide about 5 weight-percent NiO on the finished monoliths, and calcined at 1500° F.

Catalyst No. 4 was prepared by impregnating one of the nickel-containing supports with ammoniacal iridium chloride solution to provide about 0.05 weight-percent of Ir on the finished monolith, and then air dried.

Catalyst No. 5 was prepared in the same manner, using a solution of platinum chloride to give about 0.1 weight-percent Pd on the finished monolith.

Catalyst No. 6 was prepared in the same manner, using a solution of palladium chloride to give about 0.1 weight-percent Pd on the finished monolith.

Each of the foregoing catalysts was then subjected to a 100 hour engine test in which they were contacted with an exhaust gas generated from a one-cylinder gasoline engine running on a fuel containing 150 ppm S and 0.05 g Pb per gallon. In these tests (which are equivalent to 5,000 miles) the engine was run alternately at idling and cruising speeds, generating exhaust gas conversion temperatures varying between about 900° and 1250° F. After the engine tests each catalyst was estimated to contain about 0.2 weight-percent of Pb.

After the engine tests each catalyst was then activity-tested with a synthetic sulfur-containing exhaust gas as described in Examples V–VII, with the exception that the GHSV was 138,000. The results were as follows:

Table 3

| Catalyst | 90% $NO_x$ Conv. Temp., ° F. | 50% $NO_x$ Conv. Temp., ° F. | % Efficiency at 1000° F. |
|---|---|---|---|
| 4. Ni-Ir | 1160 | 720 | 67 |

Table 3-continued

| Catalyst | 90% NO$_x$ Conv. Temp., ° F. | 50% NO$_x$ Conv. Temp., ° F. | % Efficiency at 1000° F. |
|---|---|---|---|
| 5. Ni-Pt | >1500 | 1040 | 37 |
| 6. Ni-Pd | >1500 | >1500[(1)] | 21 |

[(1)]23% conversion at 1000° F.

It is readily apparent that the 100 hour engine test severely deactivated the Ni—Pt and Ni—Pd catalysts, while the Ni—Ir catalyst was still highly active despite the fact that it contained only half as much noble metal as the other two catalysts. Due to the low nickel content of the catalysts, none of them showed the high efficiency of catalysts 1–3, but the Ni—Ir catalyst nevertheless showed a substantially higher efficiency than the Pt and Pd analogs.

The following claims and their obvious equivalents are intended to define the true scope of the invention:

I claim:

1. A method for the conversion of nitrogen oxides in engine exhaust gases which comprises contacting said exhaust gases under net reducing conditions and at conversion temperatures above about 900° F with a catalyst consisting essentially of an effective catalytic amount of a dispersed nickel component and an effective catalytic amount of a dispersed iridium component, said nickel and iridium components being supported on a shaped, porous, cohesive aggregate of crystalline aluminum borate having a surface area between about 5 and 100 m$^2$/g and a porosity between about 0.3 and 1.0 ml/g, and wherein the weight ratio of B$_2$O$_3$/Al$_2$O$_3$ is between about 8/92 and 25/75, said aggregate having been formed by calcining a preshaped composite of alumina and boria, or boria precursor, at temperatures between about 1250° and 2600° F for a sufficient time to produce said crystalline aluminum borate.

2. A method as defined in claim 1 wherein said shaped aggregate is in the form of granules of about 1/32–½ inch in average diameter.

3. A method as defined in claim 1 wherein said exhaust gases contain lead compounds and sulfur compounds in amounts corresponding to a fuel content of about 0.01–4 grams Pb per gallon and about 10–500 ppm of S.

4. A method as defined in claim 1 wherein said cohesive aggregate is in the form of a thin coating supported on an inert monolithic honeycomb structure.

* * * * *